ately disposed in the flexible spline. A generally annular flexible supporting member supports one end of the flexible spline in such a manner that the flexible spline is able to flex in a radial direction but has a significant rigidity in the circumferential direction. When the spline is flexed while the flexion generation member rotates in the flexible spline, some of its teeth engage with some of the teeth of the circular spline thereby rotating the circular spline.

United States Patent [19]
Kiryu

[11] Patent Number: 4,619,156
[45] Date of Patent: Oct. 28, 1986

[54] HARMONIC GEAR APPARATUS
[75] Inventor: Yuichi Kiryu, Hyogo, Japan
[73] Assignee: Mitsubishi Denki Kabushiki Kaisha, Tokyo, Japan
[21] Appl. No.: 659,477
[22] Filed: Oct. 10, 1984
[30] Foreign Application Priority Data
  Oct. 26, 1983 [JP] Japan .................. 58-202085
[51] Int. Cl.⁴ .......................................... F16H 37/04
[52] U.S. Cl. ........................................ 74/640; 74/805
[58] Field of Search ............... 74/640, 804, 805, 438, 74/411; 474/94

[56] References Cited

U.S. PATENT DOCUMENTS

| | | | |
|---|---|---|---|
| 3,004,453 | 10/1961 | Lang | 74/804 X |
| 3,021,731 | 2/1962 | Stoeckicht | 74/411 X |
| 3,043,164 | 7/1962 | Sundt | 74/805 X |
| 3,091,979 | 6/1963 | Schaefer et al. | 74/411 X |
| 3,216,267 | 11/1965 | Dolza | 74/411 X |
| 3,304,795 | 2/1967 | Rouverol | 74/411 |
| 3,304,924 | 2/1967 | Dolza | 474/94 X |
| 3,406,583 | 10/1968 | Baier | 74/411 |
| 3,444,959 | 5/1969 | Mansfield et al. | 74/640 X |
| 3,604,287 | 9/1971 | Humphreys | 74/804 X |
| 4,082,372 | 4/1978 | Kozuki | 474/94 X |
| 4,393,727 | 7/1983 | Phillips | 474/94 X |

FOREIGN PATENT DOCUMENTS

| | | | |
|---|---|---|---|
| 844853 | 6/1970 | Canada | 74/640 |
| 2941117 | 4/1980 | Fed. Rep. of Germany | 74/411 |
| 1380497 | 10/1964 | France | 74/640 |
| 734223 | 7/1955 | United Kingdom | 74/411 |
| 2060123 | 4/1981 | United Kingdom | 74/640 |
| 754147 | 8/1980 | U.S.S.R. | 74/640 |
| 823716 | 4/1981 | U.S.S.R. | 74/411 |
| 848829 | 7/1981 | U.S.S.R. | 74/640 |
| 929921 | 5/1982 | U.S.S.R. | 74/804 |

Primary Examiner—Kenneth J. Dorner
Assistant Examiner—Joseph M. Rolnicki
Attorney, Agent, or Firm—Sughrue, Mion, Zinn, Macpeak, and Seas

[57] ABSTRACT

A harmonic gear apparatus includes a tubular circular spline having a multiplicity of teeth on an inner periphery thereof, and a flexible spline disposed in the circular spline and having a multiplicity of teeth on an outer periphery thereof, the number of which is smaller than that of the circular spline. A flexion generating member rotatably mounted on a rotary shaft is rotatably disposed in the flexible spline. A generally annular flexible supporting member supports one end of the flexible spline in such a manner that the flexible spline is able to flex in a radial direction but has a significant rigidity in the circumferential direction. When the spline is flexed while the flexion generation member rotates in the flexible spline, some of its teeth engage with some of the teeth of the circular spline thereby rotating the circular spline.

3 Claims, 8 Drawing Figures

HARMONIC GEAR APPARATUS

BACKGROUND OF THE INVENTION

The present invention relates to an improved harmonic gear apparatus.

A typical example of a conventional harmonic gear apparatus will be explained referring to FIG. 1.

In FIG. 1, reference numeral 1 designates a rotary shaft rotated by a driving device (not shown); 2, a flexion generating member of a nearly oval configuration fixed to the rotary shaft 1 so as to be rotated with the rotary shaft 1; and 3, a cylindrical flexible spline made of a flexible material disposed around the outer periphery of the flexion generating member with the inner periphery thereof slidably and rotatably in contact with the outer periphery of the rotary shaft. The flexible spline 3 has a multiplicity of teeth 3a on the outer periphery thereof. Reference numeral 4 designates a circular spline attached to a fixing member (not shown) and having on an inner periphery a multiplicity of teeth 4a which can be engaged with the teeth 3a of the flexible spline 3 and whose number is larger than that of the teeth 3a.

The thus-constructed conventional harmonic gear apparatus operates as follows. When the rotary shaft 1 is rotated, the flexion generating member 2 rotates together with the rotary shaft 1 so that engaging portions of the teeth of the flexible spline 3 and the teeth of the circular spline 4 shift sequentially with the rotation of the flexion generating member 2. Thus, since the number $N_c$ of the teeth of the circular spline 4 is larger than the number $N_s$ of the teeth of the flexible spline 3 by a number $(N_c - N_s)$, the flexible spline 3 rotates more slowly and in the opposite direction with respect to the flexion generating member 2. In this case, the gear reduction ratio n can be represented by $n = (N_c - N_s)/N_c$.

In the conventional harmonic gear apparatus, in order to absorb the flexion of the flexible spline 3, the flexion generating member 2 is formed by a flexible member of a cup-like configuration whose circumferential portion protrudes axially, and the flexible spline 3 is provided on the open end of the flexible member. An output shaft is connected to a rear portion of the flexible member. Accordingly, since the flexible member of a cup-like configuration protrudes axially, the size of the harmonic gear apparatus in the axial direction is rather long.

SUMMARY OF THE INVENTION

An object of the present invention is to thus provide a harmonic gear apparatus whose axial length is made as small as possible.

This and other objects of the invention are attained by providing a flexible member which is flexible in a radial direction so as to absorb the radial flexion of the flexible spline.

To this end, the present invention provides a harmonic gear apparatus comprising an outer tubular circular spline having a plurality of teeth on an inner periphery thereof; a flexible spline disposed within the circular spline and having a plurality of teeth on an outer periphery thereof, the number of which is smaller than that of the circular spline; a flexion generating member rotatably mounted on a rotary shaft and rotatably disposed within the flexible spline; and a generally annularly shaped flexible supporting member for supporting one end of the flexible spline in such a manner that the flexible spline is allowed to flex in the radial direction but has a given significant rigidity in the circumferential direction, whereby the flexion spline is deformed to thereby engage some of the teeth of the flexible spline with some of the teeth of the circular spline when the flexion generating member rotates within the flexible spline.

DESCRIPTION OF THE PREFERRED EMBODIMENTS

Figure 1:
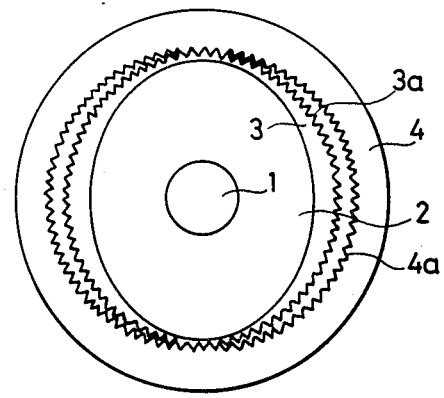
FIG. 1 is a plan view of a main part of a conventional harmonic gear apparatus.

Preferred embodiments of the present invention will be explained referring to FIGS. 2 to 8. In these figures, like reference numerals designate like components in FIG. 1.

Figure 2:
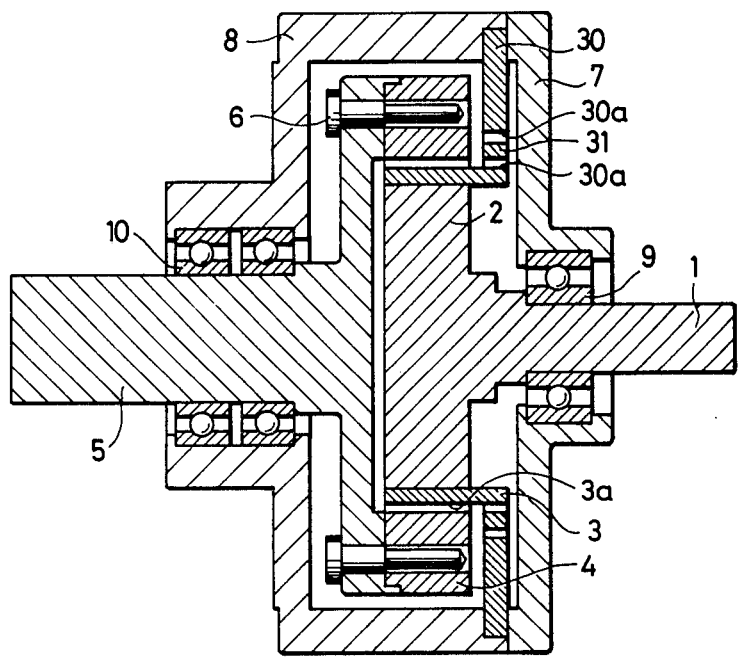
FIG. 2 is a cross section of a first embodiment of a harmonic gear apparatus according to the present invention.
Figure 3:
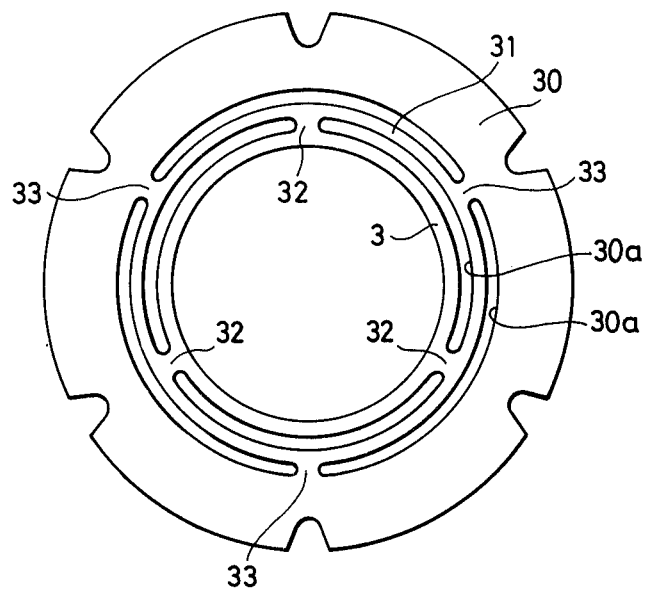
FIG. 3 is a plan view of a flexible supporting member used in the first embodiment of the present invention.

FIG. 2 is a cross section of a first embodiment of a harmonic gear apparatus according to the present invention. FIG. 3 is a plan view of a flexible supporting member shown in the first embodiment of FIG. 2.

In FIGS. 2 and 3, reference numeral 30 designates a flexible flange forming a generally annularly shaped flexible supporting member which supports one end of a flexible spline 3 in such a manner that the flexible spline 3 is freely flexible radially but not flexible axially with respect to the rotary axis of the rotary shaft 1. The flexible flange 30 has a plurality of recesses 30a provided at inner circumferential areas at equal circumferential intervals located on two concentric rings. Reference numeral 31 designates a circular elastic portion formed between two rings of the recesses 30a. The circular elastic member 31 is connected to the flexible spline 3 through three bridging portions 32 provided at intervals of 120 degrees. Further, the elastic member 31 is connected to the flexible flange 30 through three bridging portions 33 provided at intervals of 120 degrees, offset from the bridging portions 32 by 60 degrees. Reference numeral 5 designates a driven shaft fixedly connected to an annular spline 4 through bolts 6; 8, a pair of housing halves for fitting the flexible flange 30 therebetween; 9, a bearing for journaling the rotary shaft 1; and 10, a bearing for journaling the driven shaft 5.

The operation of thus-constructed harmonic gear apparatus will now be explained.

When the rotary shaft 1 is rotated, engaging portions of the teeth 3a of the flexible spline 3 and the teeth 4a of the circular spline 4 shift sequentially with the rotation of the flexion generating member 2. Since the flexible spline 3 is fixed to the housing halves 7 and 8 through the flexible flange 30, the circular spline 4 is rotated slowly, thereby driving the driven shaft 5. In this case, the reduction gear ratio n can be represented by $n=(N_c-N_s)/N_c$, the same as in the case of the conventional apparatus shown in FIG. 1, where $N_c$ and $N_s$ represent the numbers of teeth of the circular spline 4 and the flexible spline 3, respectively.

The shape of the flexible spline 3 varies in accordance with the rotation of the flexion generating member 2, and the shape of the inner circumference of the flexible flange 30, whose inner periphery is fitted to the end surface of the flexible spline 3, flexes in accordance with the flexion of the flexible spline 3. On the other hand, since the outer periphery of the flexible spline 30 is fixed to the housing halves 7 and 8, the shape of the outer periphery of the flexible flange 30 is held circular while the shape of the inner periphery thereof varies freely in accordance with the shape of the outer periphery of the flexion generating member 2. The elastic member, 31 of the flexible flange 30 absorb radial deviation of the flexible flange 30 and also absorb the reaction force of the torque applied to the driven shaft 5. If a large moment of inertia is applied to the driven shaft 5, a mechanical resonance can arise if the rigidity of the flexible flange 30 in the circumferential direction thereof is insufficient. It is thus preferable for this rigidity to be as large as possible. Thus, it is necessary to make the rigidity of the flexible flange 30 in the radial direction thereof as small as possible so as to absorb the radial deformation thereof and to make the rigidity thereof in the circumferential direction as large as possible.

In this embodiment, the elastic member 31 of the flexible flange 30 responds to a stress in a radial direction in the same manner as a leaf spring having both ends fixed having a center portion to which is applied a stress acting perpendicularly thereto. Thus, the elastic member 31 has small rigidity and is flexible in response to radial stress. On the other hand, the elastic member 31 responds to a stress in a circumferential direction in the same manner as a leaf spring to which is applied a stress in a longitudinal direction. Thus, the elastic member 31 has large rigidity with respect to stress acting in the circumferential direction. The rigidity in the axial direction is of substantially the same order as the rigidity in the radial direction, and the magnitudes thereof are determined by the thickness of the elastic member in the axial direction and the width of the elastic member in the radial direction, respectively.

In the embodiment shown in FIG. 3, the number of the bridging portions 32 on the inner circumferential ring and of the bridging portions 33 on the outer circumferential line constituting the elastic member 31 is three, but it may be any integer number not less than two.

Figure 4:
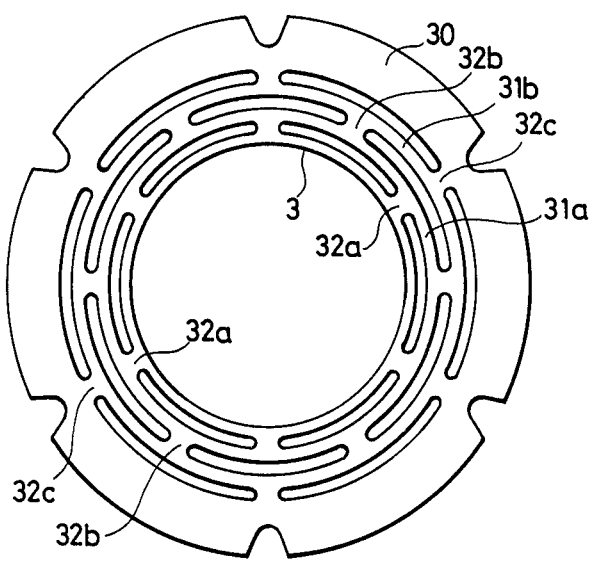
FIG. 4 is a plan view of a flexible supporting member of a second embodiment of the invention.

Further, in accordance with a second embodiment of the invention, elastic members of a generally annular configuration may be provided on a plurality of concentric rings as shown in FIG. 4. In FIG. 4, reference numerals 31a and 31b designate two elastic members of an annular configuration provided on two concentric circular rings, and 32a, 32b and 32c each designate five bridge portions provided at equal intervals.

In each of the first and second embodiments, a plurality of slits are formed in the flexible flange 30 made of elastic material thereby providing the elastic members and the bridges.

Figure 5:
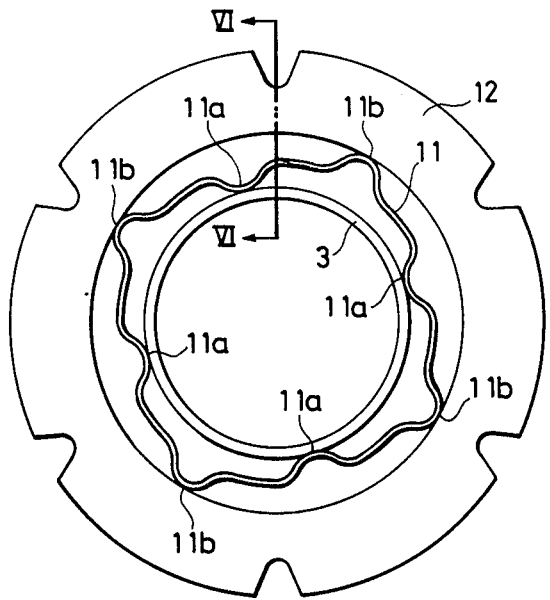
FIG. 5 is a plan view of a flexible supporting member of a third embodiment of the invention.
Figure 6:
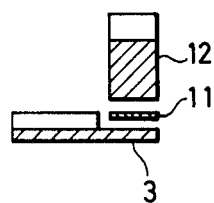
FIG. 6 is a cross section of the flexible supporting member, cut away along a line VI—VI, of FIG. 5.

FIGS. 5 and 6 show a third embodiment of the present invention. In FIGS. 5 and 6, a leaf spring 11, shaped as shown in FIG. 5, is fixedly connected to the flexible spline 3 at four connecting points 11a by welding or the like, and further the leaf spring 11 is fixedly connected to a fixed flange member 12 at four connecting points 11b, each provided between two adjacent connecting portions 11a, also by welding or the like. In this embodiment, the number of the connecting points may be any integer number not less than two. Further, another leaf spring may be provided concentric with the leaf spring 11.

Figure 7:
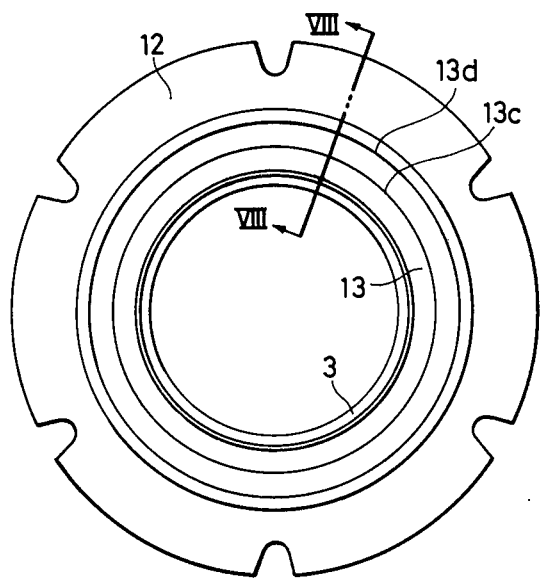
FIG. 7 is a plan view of a flexible supporting member of a fourth embodiment of the invention.
Figure 8:
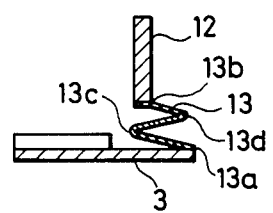
FIG. 8 is a cross section of the flexible supporting member of FIG. 7, cut away along a line VII—VII.

FIGS. 7 and 8 show a fourth embodiment of the present invention, wherein the flexible spline 3 and the fixed flange member 12 are combined through a circular bellows 13. Reference numeral 13 designates a connecting portion for connecting one end of the bellows to the flexible spline 3; 13b, a connecting portion for connecting the other end of the bellows to the flange portion 12; and 13c and 13d, crests of the bellows.

The four above-described embodiments show only some examples of a flexible supporting member of a harmonic gear apparatus according to the present invention, and the present invention is not limited to these embodiments.

In the first embodiment shown in FIG. 2, the flexible spline 3 is fixed and the circular spline 4 is connected to the driven gear 5, but the flexible spline 3 may be connected the driven gear 5 and the circular spline 4 fixed.

As described above, in accordance with the present invention, a flexible supporting member of a generally annular configuration supports one end of the flexible spline in such a manner that the flexible spline is freely flexible in the radial direction with respect to the rotary shaft and has a given rigidity in a circumferential direction. Thus, the length of the harmonic gear apparatus in an axial direction can be made very short compared with the conventional apparatus, thereby providing a small-sized and light-weight apparatus.

I claim:

1. A harmonic gear apparatus, comprising;
   a circular spline of a cylindrical configuration and having a plurality of teeth on an inner periphery thereof;
   a flexible spline of cylindrical configuration disposed within said circular spline and having a plurality of teeth on an outer periphery thereof which are engagable with said teeth of said circular spline, the number of teeth on said flexible spline being smaller than the number of said teeth on said circular spline;
   a rotary shaft;
   flexion generating means fixed to said rotary shaft and disposed within said flexible spline in contact with an inner periphery thereof, said flexion generating means operating to sequentially engage the teeth of said flexible spline with the teeth of said circular spline upon rotation of said rotary shaft; and
   an annular flexible supporting member acting essentially as a stator and being connected to a housing of said harmonic gear apparatus, said supporting member supporting one axial end of said flexible spline in a manner such that said flexible spline is relatively freely flexible in a radial direction but relatively rigid in a circumferential direction, said flexible supporting member comprising a disk element having a first radial end attached to said housing and a second radial end connected to said flexible spline, said second radial end comprising a first annular portion connected to said flexible spline, and at least one second annular portion connected to said first annular portion by means of a set of bridging elements, said bridging elements comprising radially extending connecting portions arranged in a circumferential array.

2. A harmonic gear apparatus, comprising;

a circular spline of a cylindrical configuration and having a plurality of teeth on an inner periphery thereof;

a flexible spline of cylindrical configuration disposed with said circular spline and having a plurality of teeth on an outer periphery thereof which are engagable with said teeth of said circular spline, the number of teeth on said flexible spline being smaller than the number of said teeth on said circular spline;

a rotary shaft;

flexion generating means fixed to said rotary shaft and disposed within said flexible spline in contact with an inner periphery thereof, said flexion generating means operating to sequentially engage the teeth of said flexible spline with the teeth of said circular spline upon rotation of said rotary shaft; and an annular flexible supporting member acting essentially as a stator and being connected to a housing of said harmonic gear apparatus, said supporting member supporting one axial end of said flexible spline in a manner such that said flexible spline is relatively freely flexible in a radial direction but relatively rigid in a circumferential direction, said flexible supporting member comprising a disk element having a first radial end attached to said housing and a second radial end connected to said flexible spline, said second radial end comprising an annular member connected to said flexible spline, and means for bridging between said first radial end and said annular member comprising a continuous unitary spring member in the form of a band encircling said annular member and being connected to said annular member at a plurality of angularly spaced points, said continuous spring member being connected to said first radial end at a second plurality of angularly spaced points which are offset in a circumferential direction from the points of attachment of said spring member with said annular member.

3. An apparatus as claimed in claim 1, wherein said second annular portion is connected to an adjacent radially outward portion of said annular flexible supporting member by means of a second set of bridging portions arrayed in a circumferential pattern which is angularly offset from the circumferential pattern formed by said first set of bridging elements.

* * * * *